US010102240B2

(12) United States Patent
Balasubramanyan et al.

(10) Patent No.: US 10,102,240 B2
(45) Date of Patent: Oct. 16, 2018

(54) MANAGING EVENT METRICS FOR SERVICE MANAGEMENT ANALYTICS

(71) Applicant: International Business Machines Corporation

(72) Inventors: Arun Balasubramanyan, Velacherry (IN); Yuntao Liu, Centennial, CO (US); Pamela K. Prinz, Longmont, CO (US); Mary E. Rudden, Denver, CO (US)

(73) Assignee: Inernational Business Machines Corporation, Armonk, NY (US)

( * ) Notice: Subject to any disclaimer, the term of this patent is extended or adjusted under 35 U.S.C. 154(b) by 937 days.

(21) Appl. No.: 14/538,125

(22) Filed: Nov. 11, 2014

(65) Prior Publication Data
US 2016/0134490 A1   May 12, 2016

(51) Int. Cl.
*G06F 7/00* (2006.01)
*G06F 17/00* (2006.01)
(Continued)

(52) U.S. Cl.
CPC .. *G06F 17/30371* (2013.01); *G06F 17/30575* (2013.01); *H04L 41/147* (2013.01);
(Continued)

(58) Field of Classification Search
CPC .............. G06Q 10/06; G06Q 10/0639; G06Q 10/06393; H04L 41/5003; H04L 41/5009;
(Continued)

(56) References Cited

U.S. PATENT DOCUMENTS

| 2006/0229935 | A1* | 10/2006 | Subbloie .......... G06Q 10/06375 |
| | | | 705/7.35 |
| 2009/0292720 | A1* | 11/2009 | De Peuter ......... G06F 17/30958 |
| 2013/0226317 | A1 | 8/2013 | Vijayaraghavan et al. |

FOREIGN PATENT DOCUMENTS

WO       2012116078 A1    8/2012

OTHER PUBLICATIONS

Whei-Jen Chen et al., "Using Integrated Data Management to Meet Service Objectives", Redbooks, Nov. 2009.
(Continued)

*Primary Examiner* — Jason Liao
*Assistant Examiner* — Berhanu Mitiku
(74) *Attorney, Agent, or Firm* — Patrick J. Daugherty; Driggs, Hogg, Daugherty & Del Zoppo Co., LPA

(57) ABSTRACT

Aspects of the present invention manage event metrics as a function of service management analytics. In response to determining that a version of record associated with a service level management agreement should be saved (versioned), aspects capture the presence of reference attributes of the record, and summarize and aggregate values of organizing dimensions of the reference attributes of each of a plurality of records that includes the versioned record. Aspects generate a snapshot that comprises a subset of the summarized and aggregated, final values of the organizing dimensions of the reference attributes that are selected as having values that are associated with an event occurrence, and attach the summarized and aggregated values of the organizing dimensions of to the snapshot.

19 Claims, 4 Drawing Sheets

(51) Int. Cl.
  *G06Q 10/06* (2012.01)
  *G06F 17/30* (2006.01)
  *H04L 12/24* (2006.01)
  *H04L 12/26* (2006.01)

(52) U.S. Cl.
  CPC ...... *H04L 41/5009* (2013.01); *H04L 41/5032* (2013.01); *G06Q 10/06* (2013.01); *H04L 43/067* (2013.01)

(58) Field of Classification Search
  CPC ............. H04L 41/5025; H04L 41/5006; H04L 41/5019; H04L 43/08; H04L 41/5045
  See application file for complete search history.

(56) References Cited

OTHER PUBLICATIONS

"A System and Method to Collaborating Service Operation and Network Management for Telecom Service Quality Management", Oct. 15, 2009, IPCOM000188587D.

\* cited by examiner

US 10,102,240 B2

MANAGING EVENT METRICS FOR SERVICE MANAGEMENT ANALYTICS

FIELD OF THE INVENTION

The present invention relates generally to service level management (SLM). More specifically, the present invention relates to a method, system, and computer program product for managing event metrics to be used in service management analytics.

BACKGROUND OF THE INVENTION

In information technology (IT) based businesses in which information services are provided by computer resource suppliers and are consumed by information services consumers, requirements for service level guarantees have created a demand for accountability that transcends enterprise and service provider environments. Inside enterprise organizations, service commitments are needed to justify expenditures for IT infrastructure, which are often significant. In many IT service engagements, service providers are required to prove the value of services being delivered, particularly when these services are often obtained at a premium price. Therefore, failure to deliver may mean the success or failure of the service provider. Service level agreements (SLAs) define the terms and provisions for measuring service accountability as well as for ensuring that all current and planned IT services are delivered to agreed achievable targets. Service Level Management (SLM) enables the definition, measurement, and reporting of SLA compliance, to wit, SLM is about ensuring that objective measures set forth by the SLA are implemented and delivered in satisfaction of the information services consumers.

SLAs can apply to almost any IT services. Examples of IT services include outsourcing of wide area network (WAN) managed services or remote local area network (LAN) services, or managing data warehouses for end users. Other examples may involve the combination of technologies for a given business service such as network and servers that support an overriding quality of service (QoS) for an enterprise application.

IT managers and service providers increasingly use flexible, standards-based SLM tools to measure adherence to SLAs. In many cases, SLM tools are programmed to comply with ITIL (Information Technology Infrastructure Library) standards, which provide a set of practices for IT service management that focuses on aligning IT services with the needs of business. Despite these efforts, there still are challenges of delivering IT services and ensuring end-to-end availability and performance across diverse technological infrastructure with the goal of maintaining and improving end-user satisfaction.

SUMMARY OF THE INVENTION

One aspect of the present invention provides a method of managing event metrics for service management analytics. The method includes: determining, by a computer processor, whether a record associated with service level management needs to be versioned based on metric metadata; if so, capturing, by the computer processor, present state of the record; versioning, by the computer processor, the captured present state of the record; summarizing and aggregating, by the computer processor, the versioned record; generating, by the computer processor, snapshots of the summarized and aggregated records; and attaching, by the computer processor, reference attributes to the snapshots.

Another aspect of the present invention provides a computer program product for managing event metrics for service management analytics. The computer program product includes: one or more computer readable storage medium and program instructions stored on the one or more computer readable storage medium, the program instructions including: program instructions to determine whether a record associated with service level management needs to be versioned based on metric metadata; program instructions to capture present state of the record if it is determined that record associated with the service level management needs to be versioned; program instructions to version the captured present state of the record; program instructions to summarize and aggregate the versioned record; program instructions to generate snapshots of the summarized and aggregated records; and program instructions to attach reference attributes to the snapshots.

A third aspect of the present invention provides a computer system for managing event metrics for service management analytics. The computer system includes: one or more computer processors; one or more computer readable storage medium; program instructions stored on the computer readable storage medium for execution by at least one of the one or more processors, the program instructions comprising: program instructions to determine whether a record associated with service level management needs to be versioned based on metric metadata; program instructions to capture present state of the record if it is determined that record associated with the service level management needs to be versioned; program instructions to version the captured present state of the record; program instructions to summarize and aggregate the versioned record; program instructions to generate snapshots of the summarized and aggregated records; and program instructions to attach reference attributes to the snapshots.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Overview

Figure 1:
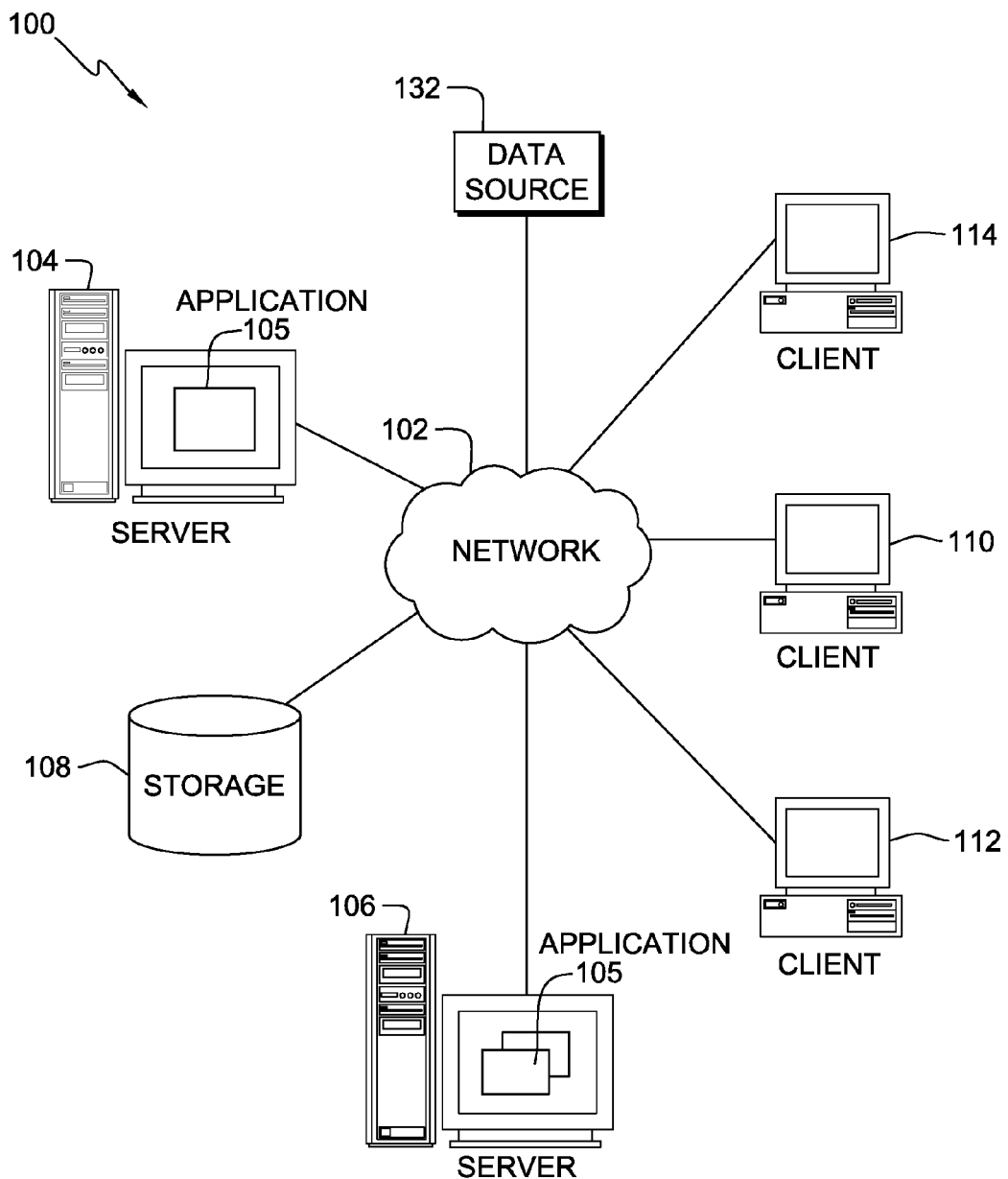
FIG. 1 depicts a pictorial representation of a network of data processing systems in which illustrative embodiments may be implemented.

Existing SLM tools provide a number of functions that aid in simplifying the building, managing, and reporting of SLAs. For instance, they provide for automatic discovery of service-level resources, automatic evaluation of service-level agreements, and trend analysis capabilities. The existing SLM tools use system management information stored in a data warehouse on service-level metrics and available components. This information is automatically available for selection as part of an SLA. In addition, existing SLM tools automatically compare the terms of the SLAs (such as metrics, thresholds, business schedules, etc.) with monitored data from IT environments and generate alerts when any of the terms of the SLA are violated.

Existing SLM tools also use a trend-analysis algorithm to proactively maintain service levels. More specifically, they use a linear-based algorithm and an exponential stress detection algorithm that provide predictive abilities to provide advance warning of breaches of an SLA and facilitate the fixing, optimizing and protecting of IT service elements.

Further, computer resources are allocated to service consumers as the resources are required within the confines of the SLAs and if such resources are available. That is, the SLM tools monitor the demand for computer resources, the current allocation of computer resources, and the various metrics representative of the level of service being provided and of the SLA with the service consumer. If the demand is high enough such that the current allocation of computer resources does not provide a level of service in the SLA requirements, as determined from the monitored metrics, and there are available resources that may be allocated, these computer resources are then allocated to the service consumer such that the minimum level of service agreed upon in the SLA is met.

To that extent, the illustrative embodiments recognize that SLM allows service providers to view metrics while in progress, while in preparation of reporting to the customer, as final reporting to the customer, and after the customer delivery. Service providers, however, also need to consider time dependent data, i.e., data that may bound to change as time passes. For example, data from operational transactional systems need to be evaluated to reflect performance against business processes within a short lifecycle. In such cases, records in the operational systems are created and go through a series of stages quickly before they are closed.

The illustrative embodiments also recognize that measurements on data apply to records at various stages of the lifecycle, and that data may change, quite frequently, after data qualification, even if the previously changed data may indicate how metric calculations are ultimately affected. The illustrative embodiments also recognize that measurements are needed to be taken based on the record state at various points in time that are triggered by predefined events, including, but not limited to, a time schedule, measurement reaching a specific target, record attributes, and assignment to a related record.

Furthermore, the illustrative embodiments recognize that measurements are from various sources and cover different levels of complexity, and measured data may include different trigger events as well as snapshot requirements. In that same vein, measurements along with supporting details need to be stored for reference purposes to identify of differentiate the trigger events, so as to allow service management teams to analyze the different measurements within the time context, to determine what is working or is not working, and to prepare action plans for continuous improvement of the quality of service being delivered in compliance with the SLA.

In an example, a relatively simple measurement in SLM includes a first call resolution with the help desk, namely, the number of counts in which an IT problem was solved within the first call and not passed onto someone else for resolution. Though measuring these metrics appears simple, the measurements set forth in this example may add varying degrees of complexity, such as difficulty of the problem, the geographic region in which the problem is occurring, the time during which the call was received (e.g., the call was received a minute before the call center closed), the server location, and the availability of the server.

Finally, illustrative embodiments recognize that penalties for breaching a SLA may be severe depending upon the particular service consumer and the agreement reached with them. The illustrative embodiments also recognize that minimizing the amount of loss due to breaching of SLAs is desirable to a service provider.

Accordingly, the illustrative embodiments used to describe the invention generally address and solve the above-described problems and other problems. The illustrative embodiments provide a method, system, and computer program product for managing and utilizing event metrics in anticipation of use within service management analytics.

The illustrative embodiments provide an ability to store point in time metrics values along with the corresponding attributes which can vary from metric to metric. More specifically, the illustrative embodiments monitor at various points of time about what is happening as data is received from a variety of sources and is created by hundreds of tools that an IT service provider typically uses when implementing a service in accordance with SLA. Further, the illustrative embodiments capture various snapshots of all or subset of data collected from the sources and their associated time values in order to determine an appropriate service level for an IT consumer and use the snapshots as an input to service management analytics. As a result, illustrative embodiments provide additional insights on how one measurement from a first data source may be dependent upon another measurement from a second data source. In some embodiments, the dependency of the measurements in the snapshot can be linked together, which could then be used to predict the cause of a possible internal or external event that may compromise proper compliance with the SLA. In some embodiments, the measurements captured by the snapshot may also be used to create a new internal or external event trigger, which can in turn be used as a condition to take future set of snapshots when these new internal or external events are detected.

The illustrative embodiments also take snapshots of point in time measurements of various data sources based on external or internal events. This allows a service provider to use the snapshots in service management analytics, which may predict a future event that may deter successful compliance with SLA, e.g., client's mission critical application required to be run continuously in service provider's server according to the specifications set forth in SLA crashing due to a hardware fault in the service provider's server. In some embodiments, the illustrative embodiments allow service providers to control or condition triggering of point in time snapshots at the metric level based on external or internal events. In other embodiments, the illustrative embodiments may notify other systems about internal or external events that were detected or may occur, based on snapshot measurements.

The illustrative embodiments are described with respect to certain data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

System for Managing Event Driven Metrics in Service Management Analytics

Figure 2:
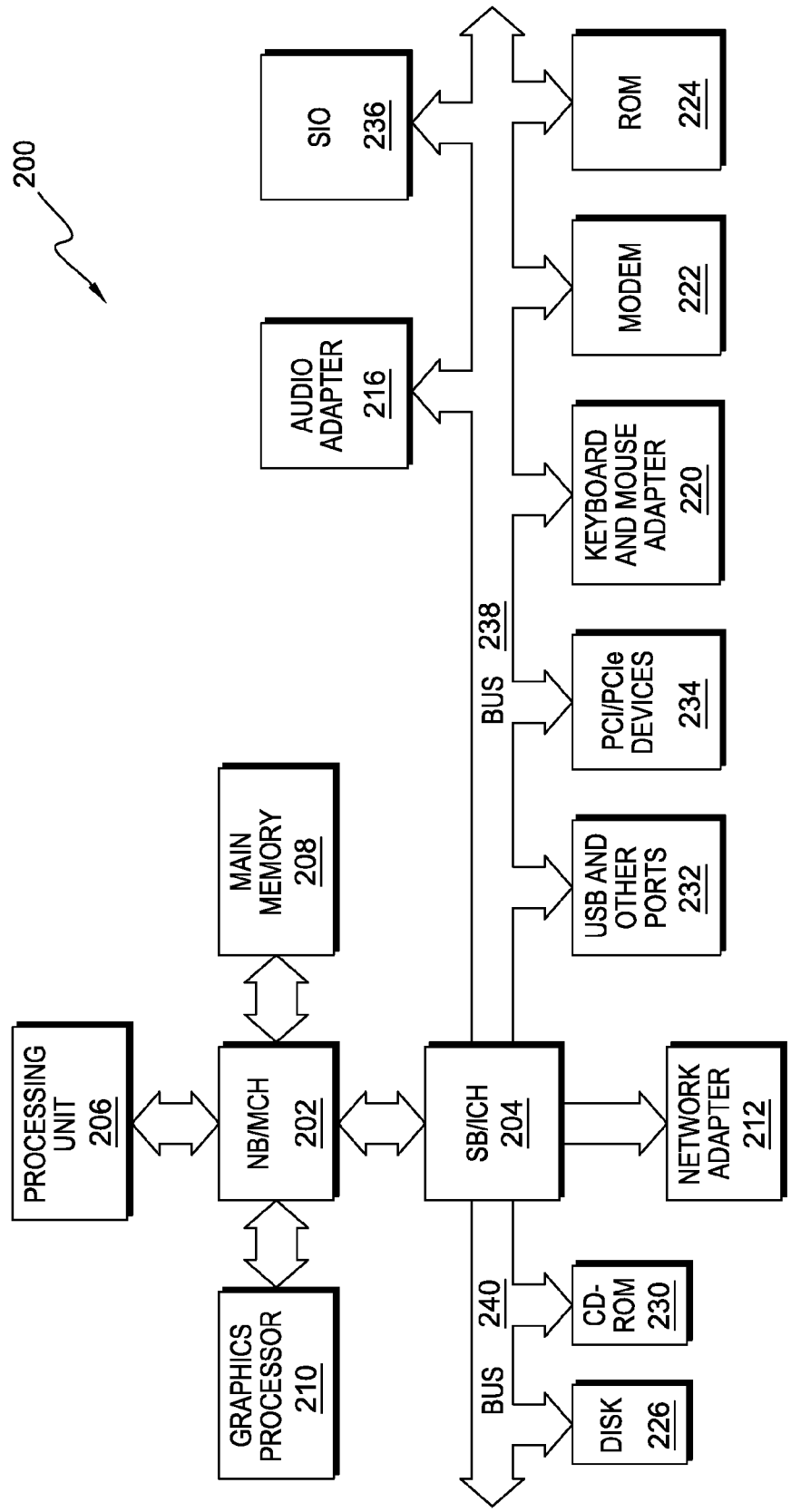
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104, or client 110, 112, or 114, may contain data and may have software applications or software tools executing thereon.

Only as an example, and without implying any limitation to such architecture, FIG. 1 depicts certain components that are usable in an example implementation of an embodiment. For example, server 104 may include application 105 (See FIG. 1) that is enabled to store point in time metrics values along with the corresponding attributes which can vary from metric to metric. More specifically, server 104 may monitor at various points of time about what is happening as data is received from a variety of sources and is created by hundreds of tools that an IT service provider typically uses when carrying out an SLA. Further, application 105 (See FIG. 1) captures various snapshots of all data collected from the sources and their associated time values in order to determine an appropriate service level for an IT consumer and use the snapshots as an input to service management analytics. Application 105 (See FIG. 1) may also provide additional insights on how one measurement from a first data source may be dependent upon another measurement from a second data source. The dependency of the measurements in the snapshot can be linked together, which could then be reviewed in order to predict the cause of a possible internal or external event that may compromise compliance with SLA. In some embodiments, application 105 (See FIG. 1) may use the measurements captured by the snapshot in order to create new sets of internal or external event triggers, which can in turn be used as a condition to take future snapshots. Server 104 may include internal and external hardware components, as depicted and described in further detail with respect to FIG. 2.

Servers 104 and 106, storage unit 108, and clients 110, 112, and 114 may couple to network 102 using wired connections, wireless communication protocols, or other suitable data connectivity. Clients 110, 112, and 114 may be, for example, a personal computer, a laptop, a workstation, a mainframe, a mini-computer, or any other type of computing unit. In some embodiments, servers 104 and 106 may facilitate the definition and maintenance of offerings and orders (e.g., Service Level Offerings and SLAs).

In one embodiment, servers 104 and 106 may enable reporting of the data within a data warehouse. In this embodiment, these reports can be pulled up and viewed in an ad-hoc fashion or they can be scheduled. Examples or reports that may be viewed include aggregate and summary views of data targeted at the Executive, Customer, and Operations level, reports showing trends towards violations, actual SLA violations, results achieved, as well as SLA components.

In the depicted example, server 104 may provide data, such as boot files, operating system images, files related to the operating system and other software applications, and applications to clients 110, 112, and 114. Clients 110, 112, and 114 may be clients to server 104 in this example. Clients 110, 112, 114, or some combination thereof, may include their own data, boot files, operating system images, files related to the operating system and other software applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110, 112, or 114 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. A computer readable or usable storage device does not include propagation media. Hard disk drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java® programming system, may run in conjunction with the operating system and provides calls to the operating system from Java® programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as continuous integration program 130 and version control program 140 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Process for Managing Event Driven Metrics in Service Management Analytics

Figure 3:
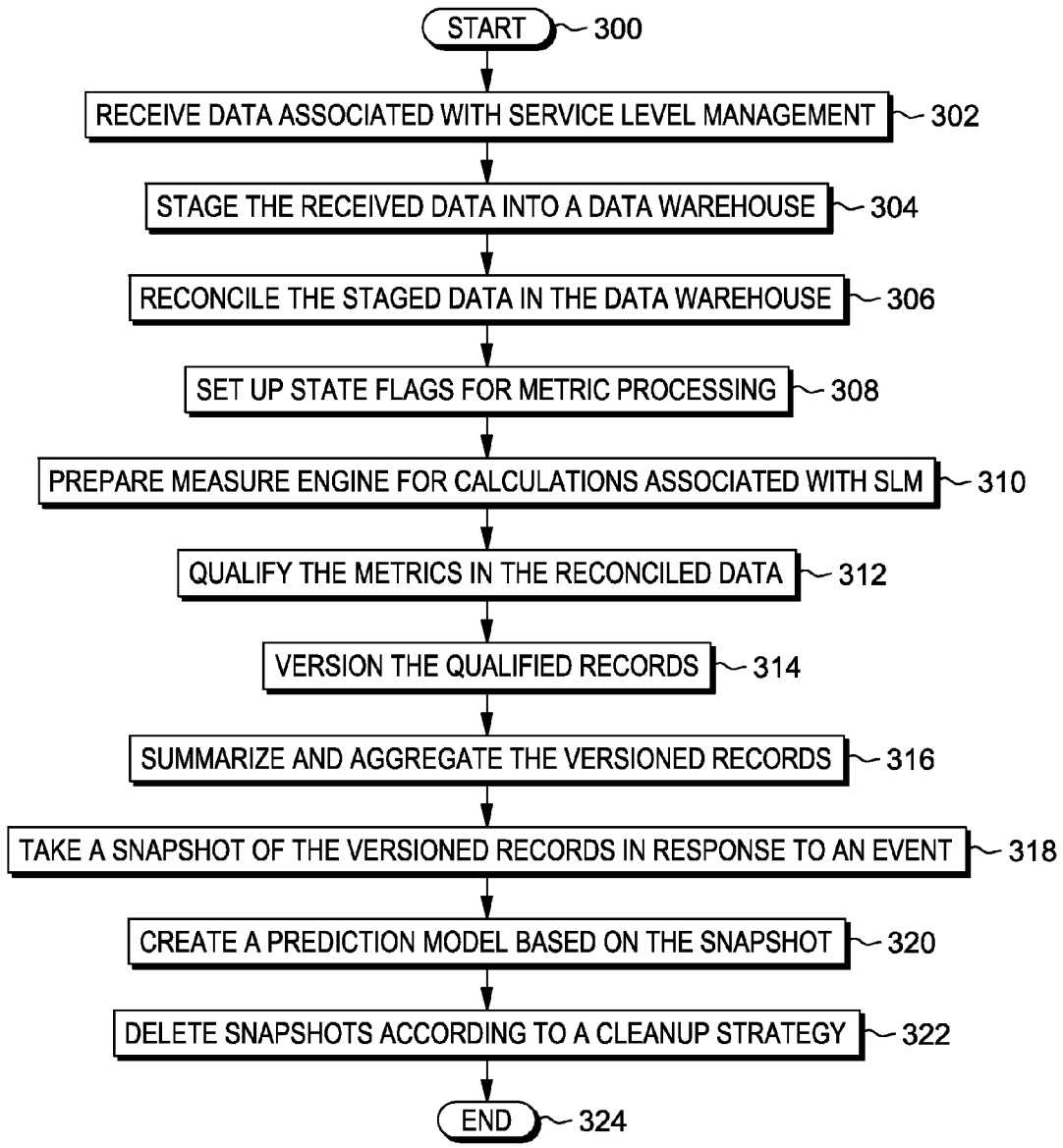
FIG. 3 depicts flowchart of a process of managing event driven metrics in service management analytics, where the process is implemented in the environment of FIG. 1 and system of FIG. 2, in accordance with embodiments of the present invention.

FIG. 3 is a flowchart of a process of managing event driven metrics in service management analytics, where the process is implemented in the environment of FIG. 1 and system of FIG. 2, in accordance with embodiments of the present invention. The process of FIG. 3 begins at step 300. In step 302, application 105 (See FIG. 1) receives data associated with service level management. In one embodiment, the data sources and data may reside in one server, e.g., server 104, and come in the same data format. In another embodiment, the data sources and data received by application 105 (See FIG. 1) may be distributed across various networks and come in different data formats. Examples of data sources and data include, but are not limited to, inter-process communication (IPC), call data, customer satisfaction data, server utilization rate, other files from databases, log files, and mainframe applications as well as custom and third-party applications data. As used herein, IPC is a set of methods for the exchange of data among multiple threads in one or more processes. Processes may be running on one or more computers connected by a network. IPC methods are divided into methods for message passing, synchronization, shared memory, and remote procedure calls (RPC). The method of IPC used may vary based on the bandwidth and latency of communication between the threads, and the type of data being communicated.

In step 304, application 105 (See FIG. 1) stages the received data into a data warehouse. More specifically, application 105 (See FIG. 1) transfers the received data into tables of relational databases, text-based flat files (or XML files) stored in file systems, or proprietary formatted binary files stored in file systems. In some embodiments, staging area architectures may be a set of simple relational tables in a target database. In other embodiments, staging area architectures may be self-contained database instances or file systems. In one embodiment, the staging area is not a relational database. In embodiments, a data warehouse may reside in server 104 or server 106 or may be accessed by server 104 or server 106 through storage 108. As used herein, data warehouse is a system used for reporting and data analysis, and serves as a central repository of data in which data from one or more disparate sources are integrated. Data warehouses store current and historical data and are used for creating trending reports for further analysis. A data warehouse may include a plurality of data tables, e.g., consistent dimensional tables, an inconsistent dimensional table, and a plurality of fact tables. The configuration of a data warehouse may be implemented using one or more computer programs under the control of an operating system and may be implemented on a single computer, on multiple computers, or in a computer network. In embodiments, all processes such as incident and change process are modeled into a dimensional data store containing facts and dimensions for the operational data.

In other embodiments, application 105 (See FIG. 1) receives and stores the definitions of the data sources in the data warehouse. For example, a data source definition directed to disk, CPU, memory, network, and process are stored in the data warehouse, in which clients 110, 112, and 114 may monitor the stored data sources through the data warehouse. In other words, the information illustrated in the example can be visible to clients. In some embodiments, the received and stored information may be available as service threshold triggers for application 105 (See FIG. 1). In some embodiments, data source definitions are rolled up to storage 108 from the data warehouse on a user specified interval.

In step 306, application 105 (See FIG. 1) reconciles the staged data in the data warehouse. In some embodiments, application 105 (See FIG. 1) may implement at least one function that would reconcile the staged data. The functions include, but are not limited to, (i) consolidating data from multiple source systems, (ii) standardizing reference data across multiple source systems and validating relationships between records and data elements from different sources, (iii) minimizing contentions with the source systems, (iv) scheduling the received data to be transformed then transferred to multiple target systems at different times, (v) cleansing data, including identification, removal, and/or update of invalid data received from a plurality of the source systems, (vi) pre-calculating the received data and applying business logic to the received data in order to support highly responsive SLA for summary reporting in target systems, and (vii) archiving the received data and troubleshooting the source and/or target systems.

In other embodiments, application 105 (See FIG. 1) populates the reconciled data into operational star schema of the business process. As used herein, a star schema is a style of data mart schema, which includes one or more fact tables referencing any number of dimension table. By populating the reconciled data into the operational star schemas, simpler queries can be performed, business reporting logic can be simplified, query performance can be gained, and aggregation operations can perform faster, although any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

In step 308, application 105 (See FIG. 1) sets up state flags for metric processing. In one embodiment, application 105 (See FIG. 1) uses domain specific configuration to determine which state flags are to be used for metric processing and/or metric qualification. Because the data being used in application 105 (See FIG. 1) run through various stages in a short life cycle process, application 105 (See FIG. 1) associate a set of flags with the data for use in metric qualification and calculations. For example, if a record is resolved but not closed, resolved flag will be set to 1 and closed flag will be set to 0. In another example, if the same record is closed, the state flags will be modified to resolved=1 and closed=1. In several embodiments, flag values for the same record across versions vary, depending on when the snapshot is triggered and the records versioned.

In step 310, application 105 (See FIG. 1) prepares measures engine for calculations associated with SLM. In one embodiment, application 105 (See FIG. 1) measures the metric metadata. In embodiment, application 105 (See FIG. 1) stores the metric metadata in metric fact tables. In this embodiment, each metric has its own unique requirements for qualification of records, duration, and credit calculations. In one embodiment, various attributes of the business process at that point in time are used to qualify the records and also in other calculations during metric processing. Application 105 (See FIG. 1) then moves the result of the metric calculations along with all supporting attributes involved in the calculation in the metric fact table. As used herein, metric refers to measurements defined to measure the service quality. For example, metric has a name, description, contract clause, target, etc., all of which may be directed to SLM. Measurements can be contractually defined or internally defined to track service quality.

As used herein, metric metadata refers to all information associated with the measurements. More specifically, metric metadata refers to details of record attributes that need to be taken as a snapshot, to be versioned, or to be created into external triggers, etc.

As used herein, metric calculations refer to calculations to be performed as part of the metric process. In some embodiments, metric measurements performed by application 105 (See FIG. 1) define a start and end time. In response, the metric calculations compute the duration based on business times, calendars and holidays, which could be specified by SLA, then application 105 (See FIG. 1) compares the duration of the record against the target to determine whether the record met or missed the target.

As used herein, supporting attributes refer to all attributes of interest in the record that are directly or indirectly associated with the measurements. For example, a ticket includes hundreds of attributes attached to it. From a measurement point of view, only a subset of those might be of interest for SLM. For first call resolution measurement, only a subset of attributes of the ticket in certain category like "Password Reset" may qualify. In this example, "Password Reset" category may become a supporting attribute for the first call resolution measurement.

In step 312, application 105 (See FIG. 1) qualifies the metrics in the reconciled data, forming qualified records. In one embodiment, application 105 (See FIG. 1) configures the criteria that determine as to whether each measurement is meaningful for SLM, since metric measurements include various levels of quality attached to such measurements. Take measuring metrics for a first-call resolution in the previous example. A call center of a larger multi-national company may receive hundreds of tickets a day. It becomes apparent that some requests can easily be resolved during the first call, while other requests will never be resolved within the first call. For example, a request for a password reset can almost always be resolved during a first call, while a request for a new part or accessories of the client device may cause the first call on the help desk to be transferred to a separate asset management division. Therefore, some embodiments provide a qualification process for most of the metrics in order to reduce noise and measure only the metrics that are meaningful to be used for service level analytics. In some embodiments, application 105 (See FIG. 1) qualifies the metrics by applying business logic highly relevant to the metrics. For example, a first call resolution measurement includes the following business logic qualification: "TICKETCLASS='INCIDENT' and CATEOGRY='PASSWORD RESET' and No Related tickets and no reassignment of workgroups for more than 2 times."

In step 314, application 105 (See FIG. 1) versions the qualified records in order to retain the state of the assets covered by SLM at a particular point of time. Each versioned record includes a time during which the qualified record was versioned by application 105 (See FIG. 1). In some embodiments, application 105 (See FIG. 1) assigns unique identifiers and version identifiers (e.g., alphanumeric strings, numbers) to each state of data to be versioned by application 105 (See FIG. 1). In one embodiment, application 105 (See FIG. 1) assigns a category and/or reference attributes to each versioned records. In one embodiment, application 105 (See FIG. 1) assigns numbers in an incremental order. The embodiments shown in step 314 are described in more detail in the discussion of FIG. 4 herein below.

In step 316, application 105 (See FIG. 1) summarizes and aggregates the versioned records. In particular, application 105 (See FIG. 1) determines the necessary final values and dimensions to which measured metrics are organized. After such determination, application 105 (See FIG. 1) aggregates all the summarized records in accordance with the determined final values and dimensions. In embodiments, the dimensions include, but are not limited to, date, time of day, day of month, time interval, location of a call center, and type of the business unit that requires to be managed by SLM. The embodiments shown in step 316 are described in more detail in the discussion of FIG. 4 herein below.

In step 318, application 105 (See FIG. 1) monitors for an internal or external event, then takes a snapshot when the internal or external event is detected. More specifically, application 105 (See FIG. 1) takes a snapshot of the summarized and aggregated records in response to an occurrence of a pre-specified internal or external event. In some embodiments, application 105 (See FIG. 1) repeats the monitoring of internal or external events and taking the snapshot as more versioned records are summarized and aggregated. In some embodiments, application 105 (See FIG. 1) takes a snapshot of every detail of the aggregated records. In other embodiments, application 105 (See FIG. 1) takes a snapshot of a subset of the aggregated records. In one embodiment, application 105 (See FIG. 1) may automatically determine the subset of the summarized and aggregated records to be recorded as a snapshot, based on the reference attributes of the summarized and aggregated records that would be relevant to the measurement or SLM. In an alternative embodiment, application 105 (See FIG. 1) may allow the user to choose which subset of the summarized and aggregated records should be captured by the snapshot. Examples of an internal or external events include, but are not limited to, a ticket coming from a specific application, and the number of tickets reaching a threshold amount. In a more specific example of an internal event, application 105 (See FIG. 1) initiates the snapshot process when calls answered time is greater than 30 seconds, takes a snapshot of abandoned call rate for every 15 minutes until calls answer time drops to less than or equal to 30 seconds. In a more specific example of an external event, application 105 (See FIG. 1) initiates the snapshot process in response to determining that problem resolution time for severity 1 incidents is less than 100% in a given day and concurrently receiving an email(s) from a pre-determined set of email addresses. The embodiments shown in step 318 are described in more detail in the discussion of FIG. 4 herein below.

In step 320, application 105 (See FIG. 1) use the snapshots to create a prediction model for service level analytics or a new set of event triggers that may activate another series of snapshots. In one embodiment, application 105 (See FIG. 1) generates a prediction model based on the snapshot. Based on the prediction model, application 105 (See FIG. 1) discovers a root cause of an internal or external event or predicts a possible future outcome that may disrupt SLM and potentially violate SLA. In another embodiment, application 105 (See FIG. 1) creates new sets of internal or external event triggers so as to allow the embodiments to take additional snapshots when the new sets of internal or external events are detected. For example, a plurality of snapshots of server data at various points of time can be examined to build a prediction model in which any snapshot of server data that includes metric measurements outside the range specified by the prediction model can be alerted to the service provider for further investigation. The embodiments shown in step 320 are described in more detail in the discussion of FIG. 4 herein below.

In step 322, application 105 (See FIG. 1) deletes the snapshots according to a cleanup strategy. In one embodiment, application 105 (See FIG. 1) deletes the snapshots and frees the memory at specified time intervals. In another embodiment, application 105 (See FIG. 1) runs a cleanup strategy to remove the snapshots that include less relevant metric measurements and preserve the snapshots that are frequently used by the service level analytics system. In some embodiments, application 105 (See FIG. 1) archives the to-be-deleted snapshots into a local storage unit, which could be storage 108. In step 324, application 105 (See FIG. 1) terminates the process of managing event driven metrics in service management analytics.

Figure 4:
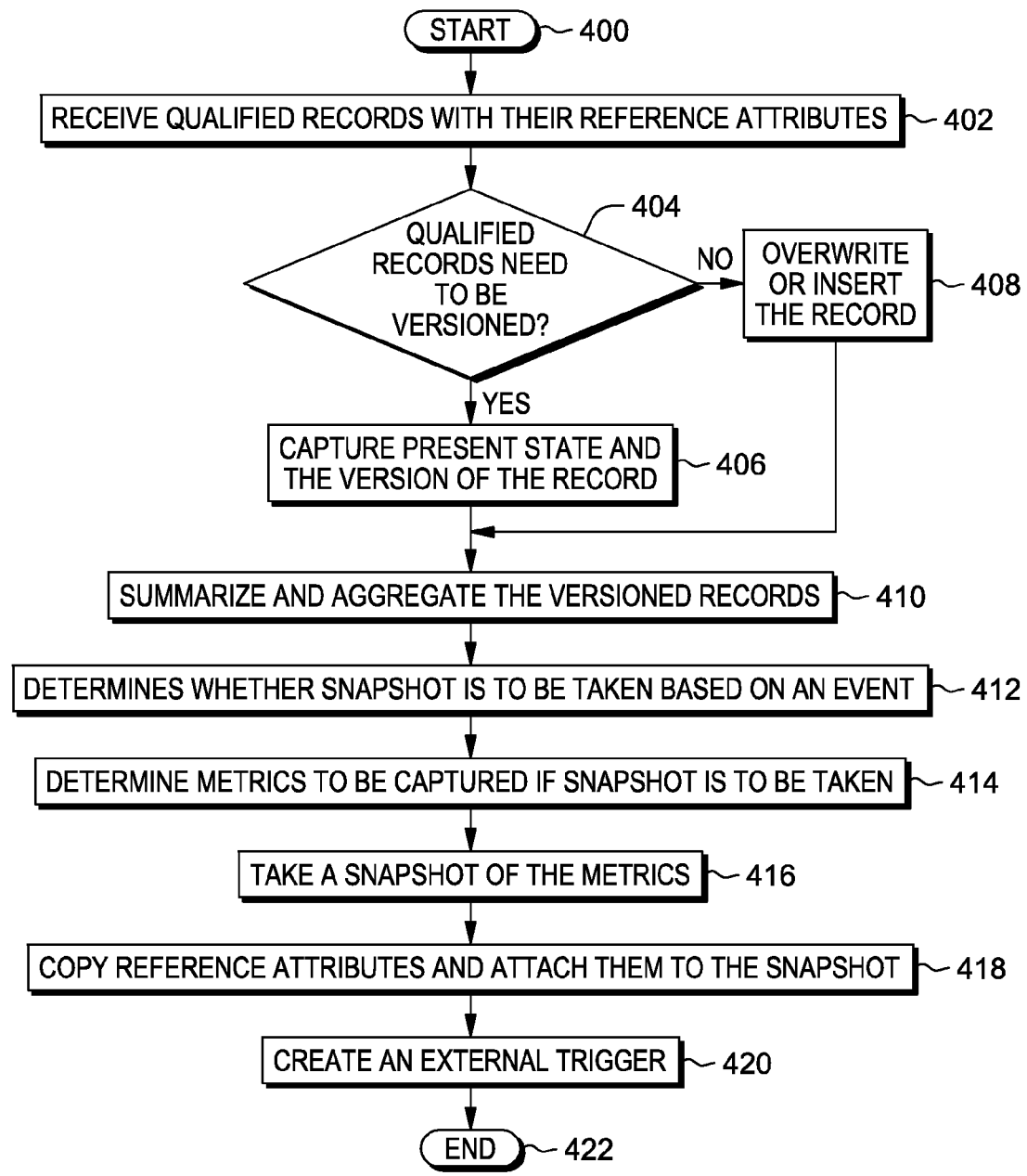
FIG. 4 depicts flowchart of a process of managing event driven metrics in service management analytics, where the process is implemented in the environment of FIG. 1 and system of FIG. 2, in accordance with embodiments of the present invention.

FIG. 4 is a flowchart of a more specific process of managing event driven metrics in service management analytics, where the process is implemented in the environment of FIG. 1 and system of FIG. 2, in accordance with embodiments of the present invention. The process of FIG. 4 begins at step 400. In step 402, application 105 (See FIG. 1) receives qualified records with their reference attributes. In these embodiments, the reference attributes refer to measurements or measurement categories that are hashed according to business logic. For example, assume that a first call resolution measurement includes the following business logic qualification: "TICKETCLASS='INCIDENT' and CATEOGRY='PASSWORD RESET' and No Related tickets and no reassignment of workgroups for more than 2 times." In this example, reference attributes being hashed include at least TICKETCLASS, CATEGORY, attributes associated with CATEGORY such as DESCRIPTION, person who opened the ticket, resolver, and person who closed the ticket. Therefore, if the qualified records that are directed to first call resolution, a reference attribute may be associated with requests for a password reset, and the measurements pertaining to these requests for a password reset will be stored accordingly. In one embodiment, some reference attributes may be directly involved with the qualified records. In another embodiment, some reference attributes may not be directly involved with the qualified records. In some embodiments, application 105 (See FIG. 1) receives only a subset of the reference attributes associated with the qualified records.

In step 404, application 105 (See FIG. 1) determines whether record needs to be versioned based on metric metadata in the qualified records. In one embodiment, application 105 (See FIG. 1) determines not to version the qualified records if the qualified records cannot be changed. In such embodiment, since the qualified records cannot change once generated for a measurement and remain static, application 105 (See FIG. 1) does not version such qualified records. In one embodiment, application 105 (See FIG. 1) considers the record "final" and is included in summarization calculations once the record meets the trigger criteria. As used herein, summarization calculations refer to aggregating the measurement values according to a set of parameters, e.g., a month, a week, by a country, etc.

In another embodiment, application 105 (See FIG. 1) causes the record to be versioned in the metric fact tables if changes to any of the attributes are detected after the record becomes final. In this embodiment, a user can specify when a record is final for a given measurement. For example, in a first call resolution ticket scenario, a ticket will be considered final only when the ticket is resolved. Despite that the ticket may have been already qualified, attributes on the ticket may still change, since the ticket was not yet considered final due to the ticket not being resolved. In this example, application 105 (See FIG. 1) may delay versioning the ticket record until the record becomes final, in order to limit versioning records that may not be useful in SLM. Once the ticket is final for a measurement and if its attributes change thereafter, application 105 (See FIG. 1) versions the record based on metric metadata in the qualified records.

In other embodiments, application 105 (See FIG. 1) allows the user to define what specific records are required to be versioned, since in some cases records may simply not change depending on the data source. If the records are specified by the user to be versioned, only records that changed within the specified record will go through the qualification criteria to determine if the records qualify. If these records qualify based on criteria, then they proceed through the metric engine for duration calculations. Thereafter, based on the targets, the record is classified as "in" or "out" criteria. Finally, the embodiment determines if the record is final and metric needs versioning.

In step 406, application 105 (See FIG. 1) captures present state, including the temporal values, and the version of the record in the fact table, if the record needs to be versioned based on the metric metadata of the qualified records. In some embodiments, present state refers to data that is being versioned and the time values during which the record is versioned. In one embodiment, application 105 (See. FIG. 1) duplicates the record and designates the record with a version number. On the other hand, in step 408, application 105 (See FIG. 1) overwrites or inserts record if a record already exists in the fact table, if the record does not need to be versioned based on metric metadata.

In step 410, application 105 (See FIG. 1) summarizes and aggregates the versioned records. The summarization process will consider all metrics qualified for aggregation at that point and write the results to a data mart for reporting purposes.

In step 412, application 105 (See FIG. 1) determines whether snapshot needs to be triggered in response to an internal or external event. As defined hereinabove, examples of an internal or external events include, but are not limited to, a ticket coming from a specific application, and the number of tickets reaching a threshold amount. As provided hereinabove, in a more specific example of an internal event, application 105 (See FIG. 1) initiates the snapshot process when calls answered time is greater than 30 seconds, takes a snapshot of abandoned call rate for every 15 minutes until calls answer time drops to less than or equal to 30 seconds. In a more specific example of an external event, application 105 (See FIG. 1) initiates the snapshot process in response to determining that problem resolution time for severity 1 incidents is less than 100% in a given day and concurrently receiving an email(s) from a pre-determined set of email addresses.

In step 414, application 105 (See FIG. 1) determines metrics to be captured if the snapshot is to be triggered. In one embodiment, application 105 (See FIG. 1) determines a subset of these metrics to be taken as a snapshot.

In step 416, application 105 (See FIG. 1) takes a snapshot of the metrics determined to be captured to a fact table in response to the detected event. In one embodiment, application 105 (See FIG. 1) copies the triggering event, the metrics determined to be captured with their corresponding unique identifier (e.g., snapshot ID), and their corresponding records from the metric fact tables that contribute to each metric summarization. In one embodiment, report uses the identifier to identify metric values at various point in time along with the underlying detail. In one embodiment, application 105 (See FIG. 1) copies the metrics determined to be captured to a fact table separate from the table in which versioned records are summarized and aggregated, and organizes the metrics in different points in time based on events identified.

In step 418, application 105 (See FIG. 1) copies reference attributes and attach them to the snapshot having the unique identifier for the event. In one embodiment, application 105 (See FIG. 1) captures all of the current state and the version of the record in the fact table along with the version number of the table, once the record is versioned. By attaching the attributes to the snapshot having the unique identifier for the event, data is structured in a manner that it is easily possible for the user to query the summarized value of a particular snapshot and the records associated with the summarized value along with the reference attributes. In these embodiments, the reference attributes refer to measurements or measurement categories that are hashed according to business logic.

In step 420, application 105 (See FIG. 1) determines whether external event trigger is needed, and if so, creates an external event trigger. In one embodiment, application 105 (See FIG. 1) generates a communication such as email in response to the snapshot. In another embodiment, application 105 (See FIG. 1) generates a new set of measurements from different reference attributes to be summarized and aggregated. Thus, application 105 (See FIG. 1) in one embodiment may be programmed to initiate immediate action in response to reading the measurements in the snapshot. In some embodiments, application 105 (See FIG. 1) may transfer the snapshots to another server in which service level analytics can be initiated based on the snapshots. In step 422, application 105 (See FIG. 1) terminates the process of managing event driven metrics in service management analytics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for managing event metrics as a function of service management analytics, the method comprising executing on a computer processor:
   determining that a record associated with a service level management agreement needs to be versioned in response to determining that metric metadata attribute values of the record are changeable;
   in response to determining that the record needs to be versioned, capturing a present state of values of a plurality of reference attributes of the record, and generating a versioned record as a function of the captured present state of values of the plurality of reference attributes and a time during which the versioned record is generated;
   summarizing and aggregating values of a plurality of organizing dimensions of the reference attributes of each of a plurality of records that comprises the versioned record;
   generating a snapshot that comprises a subset of the summarized and aggregated final values of the organizing dimensions of the reference attributes that are selected as having values that are associated with an event occurrence; and
   attaching the summarized and aggregated values of the plurality of organizing dimensions of the reference attributes to the snapshot.

2. The method according to claim 1, further comprising:
   generating the snapshot in response to determining that the event occurrence compromises compliance with the service level management agreement; and
   wherein the event occurrence is selected from the group consisting of a receipt of a ticket from a specific application, a total number of received tickets reaching a threshold amount, and a value of organizing dimension of the reference attributes reaching a threshold value.

3. The method according to claim 2, further comprising:
   determining whether the record needs to be versioned based on the metric metadata, wherein each metric represented by the metric metadata includes its own unique requirements for qualification of records, duration, and credit calculations; and
   wherein the values of reference attributes of the record are selected from the group of values consisting of ticket class, incident, category, category description, identity of the person who opened a ticket, identity of the person who resolved the ticket, and identity of the person who closed the ticket.

4. The method according to claim 3, further comprising:
   in response to determining that the record needs to be versioned based on the metric metadata, saving the captured present state of the values of the plurality of reference attributes of the record and a version of the record in a fact table; and
   wherein the plurality of organizing dimensions values comprises a time of day, a day of the month, a time interval, a location of a call center, and a type of a business unit for which management is required by the service level management agreement.

5. The method according to claim 4, further comprising:
   in response to determining that the record does not need to be versioned based on the metric metadata, overwriting the record in the fact table in response to determining that the record already exists in the fact table.

6. The method according to claim 5, further comprising:
   generating a prediction model based on the snapshot and the attached summarized and aggregated values of the plurality of organizing dimensions of the reference attributes;
   creating a new event trigger as a function of the prediction model that causes the generation of an additional snapshot in response to a determination that is selected from the group consisting of discovering a root cause of the event occurrence, and predicting a future outcome value of one of the reference attributes that violates the service level management agreement.

7. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the determining that the record needs to be versioned in response to determining that metric metadata attribute values of the record are changeable, the capturing the present state of values of the plurality of reference attributes of the record, the generating the versioned record, the summarizing and aggregating the values of the plurality of organizing dimensions, the generating the snapshot, and the attaching the summarized and aggregated values of the plurality of organizing dimensions of the reference attributes to the snapshot.

8. A system, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   determines that a record associated with a service level management agreement needs to be versioned in response to determining that metric metadata attribute values of the record are changeable;
   in response to determining that the record needs to be versioned, captures a present state of values of a plurality of reference attributes of the record, and generates a versioned record as a function of the captured present state of values of the plurality of reference attributes and a time during which the versioned record is generated;
   summarizes and aggregates values of a plurality of organizing dimensions of the reference attributes of each of a plurality of records that comprises the versioned record;
   generates a snapshot that comprises a subset of the summarized and aggregated final values of the organizing dimensions of the reference attributes that are selected as having values that are associated with an event occurrence; and
   attaches the summarized and aggregated values of the plurality of organizing dimensions of the reference attributes to the snapshot.

9. The system of claim 8, wherein the processor executes the program instructions stored on the computer-readable storage medium via the computer readable memory and thereby:

generates the snapshot in response to determining that the event occurrence compromises compliance with the service level management agreement; and wherein the event occurrence is selected from the group consisting of a receipt of a ticket from a specific application, a total number of received tickets reaching a threshold amount, and a value of organizing dimension of the reference attributes reaching a threshold value.

10. The system of claim 9, wherein the processor executes the program instructions stored on the computer-readable storage medium via the computer readable memory and thereby:

determines whether the record needs to be versioned based on the metric metadata, wherein each metric represented by the metric metadata includes its own unique requirements for qualification of records, duration, and credit calculations; and wherein the values of reference attributes of the record are selected from the group of values consisting of ticket class, incident, category, category description, identity of the person who opened a ticket, identity of the person who resolved the ticket, and identity of the person who closed the ticket.

11. The system of claim 10, wherein the processor executes the program instructions stored on the computer-readable storage medium via the computer readable memory and thereby:

in response to determining that the record needs to be versioned based on the metric metadata, saves the captured present state of the values of the plurality of reference attributes of the record and a version of the record in a fact table; and wherein the plurality of organizing dimensions values comprises a time of day, a day of the month, a time interval, a location of a call center, and a type of a business unit for which management is required by the service level management agreement.

12. The system of claim 11, wherein the processor executes the program instructions stored on the computer-readable storage medium via the computer readable memory and thereby:

in response to determining that the record does not need to be versioned based on the metric metadata, overwrites the record in the fact table in response to determining that the record already exists in the fact table.

13. The system of claim 12, wherein the processor executes the program instructions stored on the computer-readable storage medium via the computer readable memory and thereby:

generates a prediction model based on the snapshot and the attached summarized and aggregated values of the plurality of organizing dimensions of the reference attributes; and creates a new event trigger as a function of the prediction model that causes the generation of an additional snapshot in response to a determination that is selected from the group consisting of discovering a root cause of the event occurrence, and predicting a future outcome value of one of the reference attributes that violates the service level management agreement.

14. A computer program product for managing event metrics as a function of service management analytics, the computer program product comprising:

a computer readable storage medium having computer readable program code embodied therewith, wherein the computer readable storage medium is not a transitory signal per se, the computer readable program code comprising instructions for execution by a processor that cause the processor to:

determine that a record associated with a service level management agreement needs to be versioned in response to determining that metric metadata attribute values of the record are changeable;

in response to determining that the record needs to be versioned, capture a present state of values of a plurality of reference attributes of the record, and generate a versioned record as a function of the captured present state of values of the plurality of reference attributes and a time during which the versioned record is generated;

summarize and aggregate values of a plurality of organizing dimensions of the reference attributes of each of a plurality of records that comprises the versioned record;

generate a snapshot that comprises a subset of the summarized and aggregated final values of the organizing dimensions of the reference attributes that are selected as having values that are associated with an event occurrence; and attaches the summarized and aggregated values of the plurality of organizing dimensions of the reference attributes to the snapshot.

15. The computer program product of claim 14, wherein the computer readable program code instructions for execution by the processor further cause the processor to:

generate the snapshot in response to determining that the event occurrence compromises compliance with the service level management agreement; and wherein the event occurrence is selected from the group consisting of a receipt of a ticket from a specific application, a total number of received tickets reaching a threshold amount, and a value of organizing dimension of the reference attributes reaching a threshold value.

16. The computer program product of claim 15, wherein the computer readable program code instructions for execution by the processor further cause the processor to:

determine whether the record needs to be versioned based on the metric metadata, wherein each metric represented by the metric metadata includes its own unique requirements for qualification of records, duration, and credit calculations; and wherein the values of reference attributes of the record are selected from the group of values consisting of ticket class, incident, category, category description, identity of the person who opened a ticket, identity of the person who resolved the ticket, and identity of the person who closed the ticket.

17. The computer program product of claim 16, wherein the computer readable program code instructions for execution by the processor further cause the processor to:

in response to determining that the record needs to be versioned based on the metric metadata, save the captured present state of the values of the plurality of reference attributes of the record and a version of the record in a fact table; and wherein the plurality of organizing dimensions values comprises a time of day, a day of the month, a time interval, a location of a call center, and a type of a business unit for which management is required by the service level management agreement.

18. The computer program product of claim 17, wherein the computer readable program code instructions for execution by the processor further cause the processor to:
- in response to determining that the record does not need to be versioned based on the metric metadata, overwrite the record in the fact table in response to determining that the record already exists in the fact table.

19. The computer program product of claim 18, wherein the computer readable program code instructions for execution by the processor further cause the processor to:
- generate a prediction model based on the snapshot and the attached summarized and aggregated values of the plurality of organizing dimensions of the reference attributes; and
- create a new event trigger as a function of the prediction model that causes the generation of an additional snapshot in response to a determination that is selected from the group consisting of discovering a root cause of the event occurrence, and predicting a future outcome value of one of the reference attributes that violates the service level management agreement.

\* \* \* \* \*